(12) United States Patent
Hashimoto et al.

(10) Patent No.: US 6,769,445 B2
(45) Date of Patent: Aug. 3, 2004

(54) VALVE DRIVE DEVICE

(75) Inventors: Katsuo Hashimoto, Nagano (JP);
Shigeru Ozawa, Nagano (JP)

(73) Assignee: Kabushiki Kaisha Sankyo Seiki Seisakusho, Nagano (JP)

(*) Notice: Subject to any disclaimer, the term of this patent is extended or adjusted under 35 U.S.C. 154(b) by 98 days.

(21) Appl. No.: 10/222,821

(22) Filed: Aug. 19, 2002

(65) Prior Publication Data

US 2003/0034472 A1 Feb. 20, 2003

(30) Foreign Application Priority Data

Aug. 20, 2001 (JP) .................................. P2001-248919

(51) Int. Cl.[7] .............................................. F16K 11/00
(52) U.S. Cl. ............................ 137/15.21; 137/315.09; 137/315.17
(58) Field of Search ...................... 137/15.17, 15.21, 137/315.09, 315.17, 315.38

(56) References Cited

U.S. PATENT DOCUMENTS 4,723,567 A * 2/1988 Phlipot et al. ......... 137/315.17
5,680,880 A * 10/1997 Miyake et al. ............... 137/338
6,682,045 B2 * 1/2004 Hashimoto ............. 251/129.11

FOREIGN PATENT DOCUMENTS

JP    2000-310348 A    7/2000

* cited by examiner

Primary Examiner—Edward K. Look
Assistant Examiner—John K. Fristoe, Jr.
(74) Attorney, Agent, or Firm—Sughrue Mion, PLLC

(57) ABSTRACT

A gear meshing with a pinion controls the angle of rotation of a valve element which is brought into sliding contact with a valve seat, thereby controlling the opening and closing of a communicating hole of outflow pipe. During welding the valve seat plate and a housing, a hook portion of an upper portion of the gear is retained by a retaining portion to cause the valve element to be spaced apart from the valve seat. After natural cooling, the pinion is remotely operated by an electric motor to rotate the gear, thereby canceling the holding. A resilient arm causes the gear to be disengaged from the retaining portion by its urging force, brings the valve element into pressure contact with the valve seat, and allows the opening/closing operation to function smoothly.

6 Claims, 11 Drawing Sheets

VALVE DRIVE DEVICE

The present application is based on Japanese Patent Application No. 2001-248919, the entire contents of which are incorporated herein by reference.

BACKGROUND OF THE INVENTION

The present invention relates to a motor-operated expansion valve, and more particularly to a mechanism for avoiding welding heat applied to a valve element.

Generally, a motor-operated expansion valve consists of a main body making up a valve mechanism and a housing for hermetically sealing the valve mechanism. For example, in a three-way valve in a motor-operated expansion valve 100 shown in FIG. 13 (disclosed in Japanese Patent Publication No. JP-A-2000-310348), the opening and closing of two outflow pipes 106a and 106b are controlled by a single valve element 102 provided at a distal end of a rotor 101. Therefore, to ensure that the heat from a tungsten inert gas (TIG) welding position 104a for gastightly sealing a housing 104 and a main body 105 will not adversely affect a sliding contact surface 102a of the valve element 102, the valve element 102 is disposed in a central portion of the main body 105 which is the farthest from the welding position 104a at an outer periphery of the housing. Furthermore, to make it difficult for the welding heat from welds 105b at the outflow pipes 106a and 106b to be transmitted to the resin-made valve element 102, a thick machined part having a large thermal capacity is used for a metallic valve seat plate portion.

In addition, communicating holes 107a and 107b communicating with the two outflow pipes 106a and 106b are formed in a valve seat 105a in such a manner as to be open to a valve chamber 109, and are selectively caused to communicate with an inlet port 110 through the valve element 102 inside the valve chamber 109. As shown in FIGS. 14A to 14D, a rib 103 has a shape which surrounds a crescent recess 111, and the single valve element 102 changes over the partition of the communicating holes 107a and 107b in four modes in correspondence with the angle of rotation of the rotating shaft 101 which is displaced in response to an electrical signal sent from a stator coil 112. Namely, FIG. 14A shows a state in which the communicating hole 107a is closed and the communicating hole 107b is open; FIG. 14B shows a state in which both the communicating hole 107a and the communicating hole 107b are closed; FIG. 14C shows a state in which the communicating hole 107a is open and the communicating hole 107b is closed; and FIG. 14D shows a state in which both the communicating hole 107a and the communicating hole 107b are open.

In the mechanism shown in FIG. 13, in which the opening and closing of the two outflow pipes 106a and 106b are thus controlled by the single valve element 102, firstly, the distance between the two outflow pipes 106a and 106b is short, and the working of parts and the blazing and welding operation are difficult. Secondly, since the changeover of the four modes (open/close, close/open, open/open, and close/close) shown in FIGS. 14A through 14D is effected while the single valve element 102 is turned by one revolution, there is no leeway in the space, which makes it impossible to construct a multi-way valve of four or more ways.

Thirdly, it is impossible to independently change the flowrate control pattern of the two outflow pipes 106a and 106b, and the pattern becomes a simple one comprising only the changeover between open and close. Fourthly, since the resin-made valve element 102 is brought into pressure contact with the valve seat 105a by a spring 108, if the temperature of the metal becomes high, irregularities occur on the resin surface, and the surface roughness of the resin becomes destroyed due to heat, resulting in the occurrence of leakage in the fully closed state. Accordingly, to avoid the welding heat, it is necessary to finish TIG welding in a short time and effect rapid cooling after welding so as to minimize the effect on the resin-made valve element. For this reason, the operation requires expert skill, and uncertainty remains in the stability of quality and in reliability.

SUMMARY OF THE INVENTION

The object of the invention is to provide a valve drive device in which the above problem is overcome in a suitable manner.

To overcome the problem, there has been conceived and embodied a three-way valve 200a of a motor-operated expansion valve 200 having the construction shown in FIG. 15. Valve elements 202a and 202b are separately provided for openings 207a and 207b of outflow pipes 206a and 206b which are selectively made to communicate with an inflow pipe 210 in a valve chamber 209, and the valve elements 202a and 202b are rotated in response to inputs of electrical signals from a stator coil 212 so as to control the opening and closing of the openings 207a and 207b.

However, since the positions of the valve elements 202a and 202b geared with and disposed radially from a pinion 203 formed integrally with a rotor 201 with respect to the two outflow pipes 206a and 206b are close to an outer peripheral portion 204a which is subject to heating by TIG welding for gastightly sealing a housing 204 and a main-body base plate 205, the resin-made valve elements 202a and 202b which are held in pressure contact with a valve seat 205a by leaf springs 208 are directly exposed to welding heat and become deteriorated or deformed, possibly resulting in faulty functioning.

In addition, consideration must also be given to the fact that the valve elements 202a and 202b are similarly affected by welding heat from welds 205b for gastightly connecting the outflow pipes 206a and 206b to the main-body base plate 205. To avoid the effect of such welding heat on the valve elements 202a and 202b, it is necessary to increase the thermal capacity by enlarging the circumference of the metallic main-body base plate 205 including the valve seat or by increasing the thickness thereof. Hence, there are problems in terms of cost and miniaturization.

In the present invention, to solve these problems, an air heat-insulation layer is formed by holding the valve element in an initial period of assembly and thereby providing a gap between the valve element and the valve seat.

In accordance with the invention, there is provided a valve drive device having a plurality of openings for communicating with an inflow pipe and an outflow pipe, said valve drive device comprising:

a valve element for opening and closing said openings;

a driving member for driving said valve element;

a rotation transmitting member for transmitting rotation from said driving member to said valve element;

a valve seat plate in which said openings are formed and on which said valve element is slid in pressure contact therewith so as to open and close said openings; and a housing for gastightly sealing said valve seat plate and said valve element together with said driving member and said rotation transmitting member so as to form a hermetically sealed space; and a holding device provided for tentatively retaining said valve element at a spaced-apart position spaced apart from said valve seat plate;

wherein said valve element is retained at the space-apart position when said valve seat plate and said housing are welded together.

By the above construction, an air layer extremely excelling in heat insulation is formed between the valve element and the valve seat plate, so that the valve element can be protected from welding heat, and the deformation of a sliding contact surface is prevented. Therefore, it is possible to satisfactorily maintain the sealing characteristic of the valve element.

In the invention, the holding device causes the valve element to be spaced apart from the valve seat plate in opposition to an urging device for bringing the valve element into pressure contact with the valve seat plate, the retention by the holding device is canceled after welding, and the valve element which returned to an abutment position against the valve seat plate by the urging device is spaced apart to a position in which rotating operation of the valve element for opening and closing is not interfered by the holding device. Thus, in the state in which the valve element is retained prior to effecting the starting of initial setting, the air insulating layer can be secured, and it is possible to effect the welding of the piping. In addition, the retention by the holding device is irreversible, and the valve element which has been disengaged once is disengaged completely and reliably from the holding device. The valve element upon cancellation of the retention is brought into close contact with the valve seat plate to allow the openings to sufficiently maintain gastightness, and its rotating operation for opening and closing can be effected quite freely without trouble.

Furthermore, the holding operation for retaining the valve element by the holding device is effected by the rotation of the valve element, and there is provided a restricting position for preventing the rotation at a predetermined angle of rotation. Namely, by setting the restricting position for preventing the rotation by the operation of holding the valve element by its rotation, each rotation transmitting member (gear) is retained at a position (meshing position) in which the rotation transmitting member is in a state of being interlocked with the driving member (pinion), so that the driving member (pinion) is capable of being smoothly linked with the rotation transmitting member (gear) without mutually interfering therewith. Since there is no need to adjust the angles of rotation of the gears at the time of assembly, a gear assembly jig is not required, and the assembling process can be simplified.

In addition, since the cancellation of the retention of the urging device and the valve element is effected by the operation of the valve element itself, after the valve drive device is gastightly sealed in the housing, the retention can be reliably canceled by electrical remote operation from the outside. Conversely, since the mechanical retention cannot be canceled unless the electrical operation is used, the sealing characteristic of the valve element does not deteriorate even if heat treatment is provided for the exterior fittings prior to wiring.

Furthermore, a relative angular relationship between origins of starting of the valve elements and a preventing portion provided on the rotation transmitting member for mechanically preventing the rotation at the origins of starting are uniformly defined by the restricting position. Since the proper angular position of the gear is thus ensured automatically in the assembly of parts by virtue of the restricting position, and because the number of pulses up to an electrical origin of the rotor by the pulse driving from the stator can be set in advance, the matching of origins of mechanical starting of the valve elements can be easily attained without resorting to visual observation after the valve drive device has been gastightly sealed in the housing.

Preferably, the rotation transmitting member is a gear.

BRIEF DESCRIPTION OF THE PREFERRED EMBODIMENTS

FIGS. 2A to 2C are diagrams illustrating a valve seat plate in the valve drive device in accordance with the invention, in which FIG. 2A is a plan view, FIG. 2B is a sectional view taken along line b—b of FIG. 2A; and FIG. 2C is a rear view taken in the direction of arrows c—c of FIG. 2B;

Figure 3A:
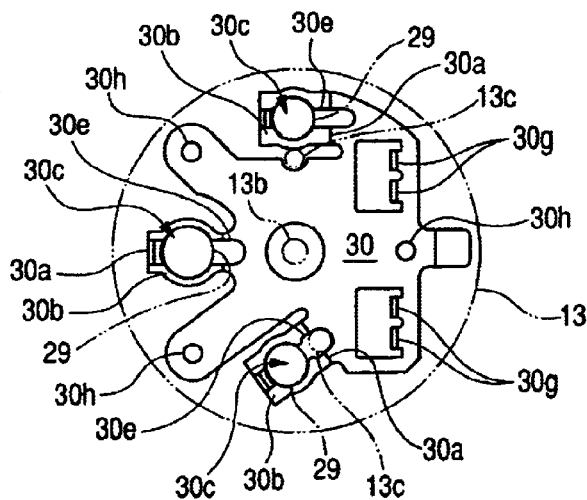
Figure 3B:
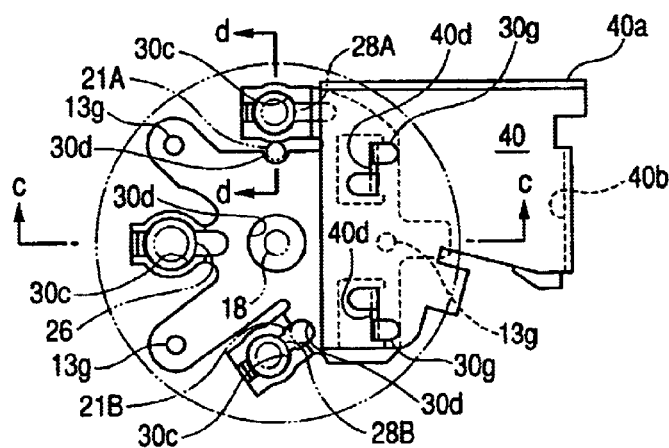
Figure 3C:
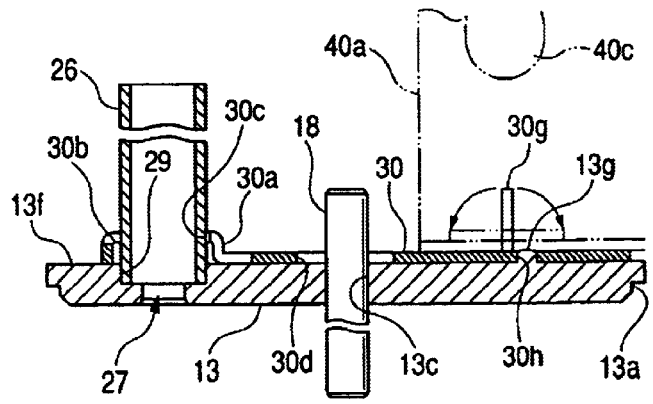
Figure 3D:
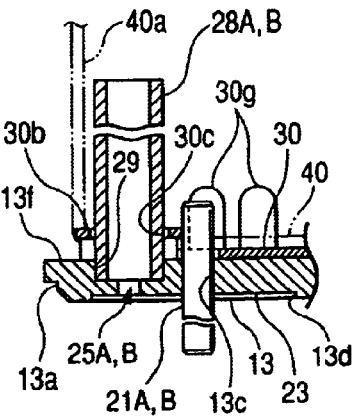
Figure 4A:
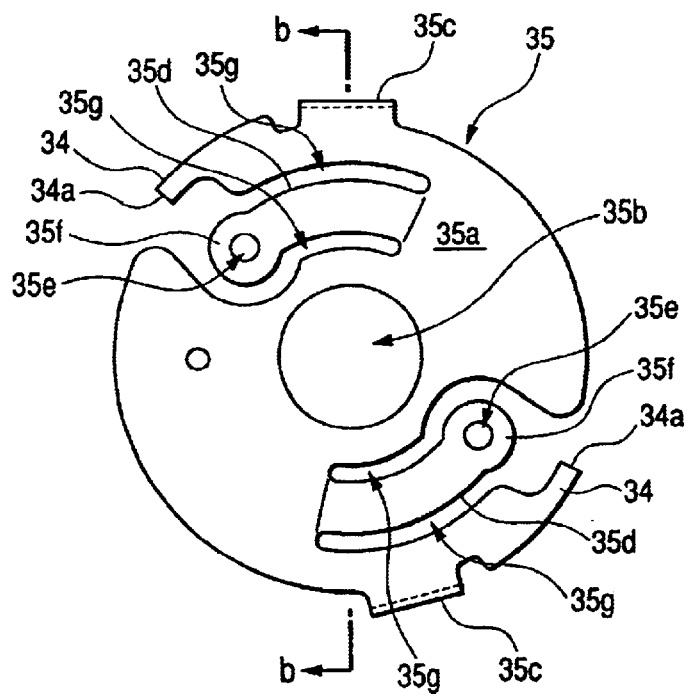
Figure 4B:
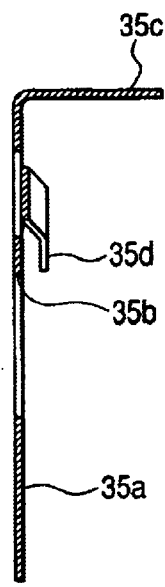
Figure 5:
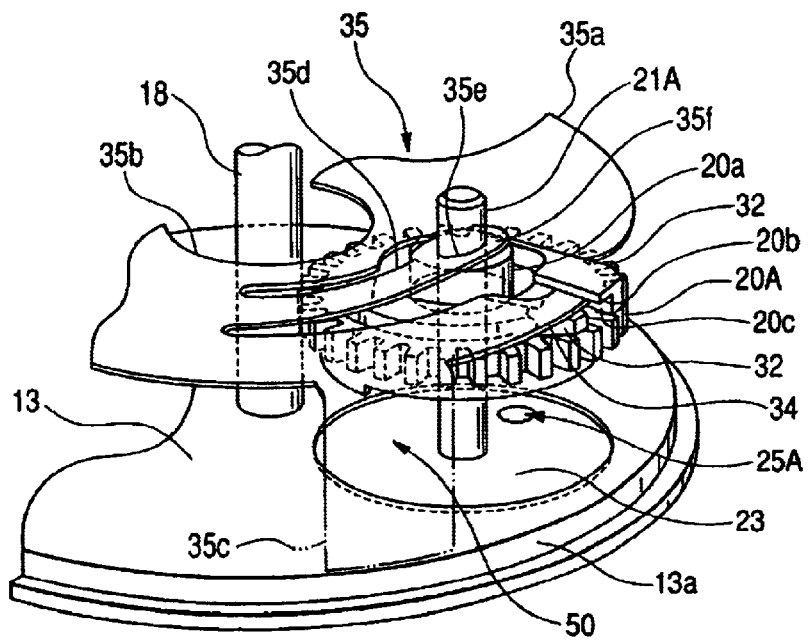
Figure 6:
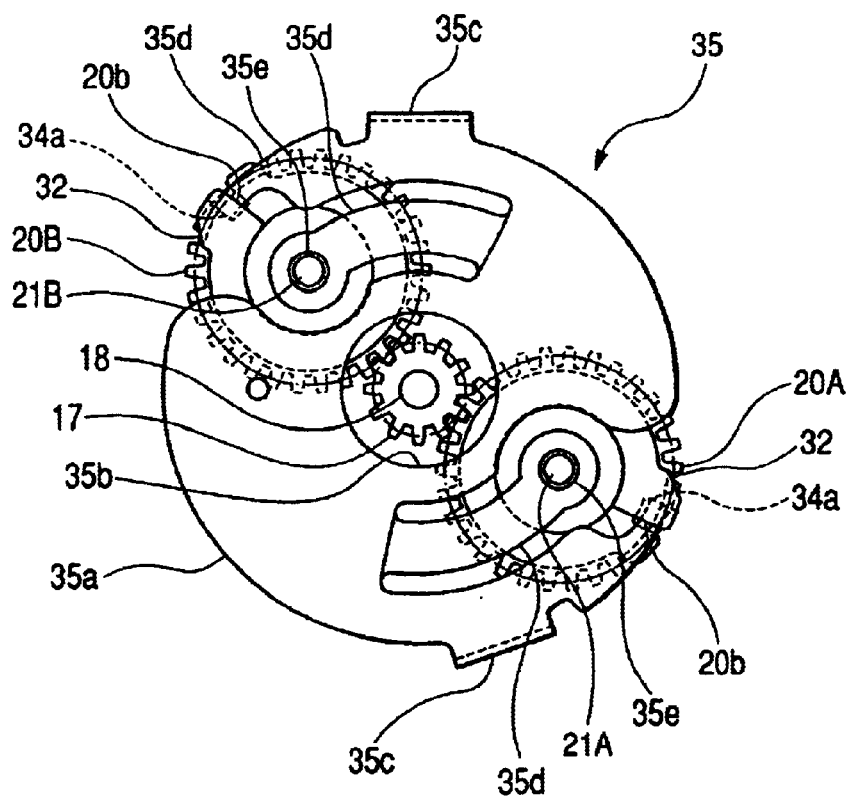
Figure 7:
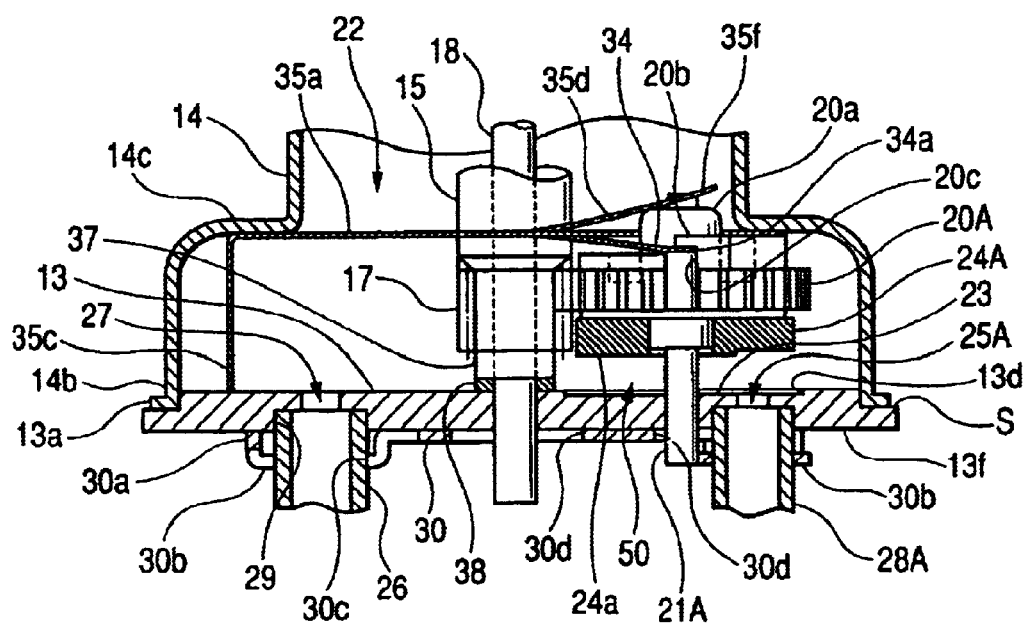
Figure 8:
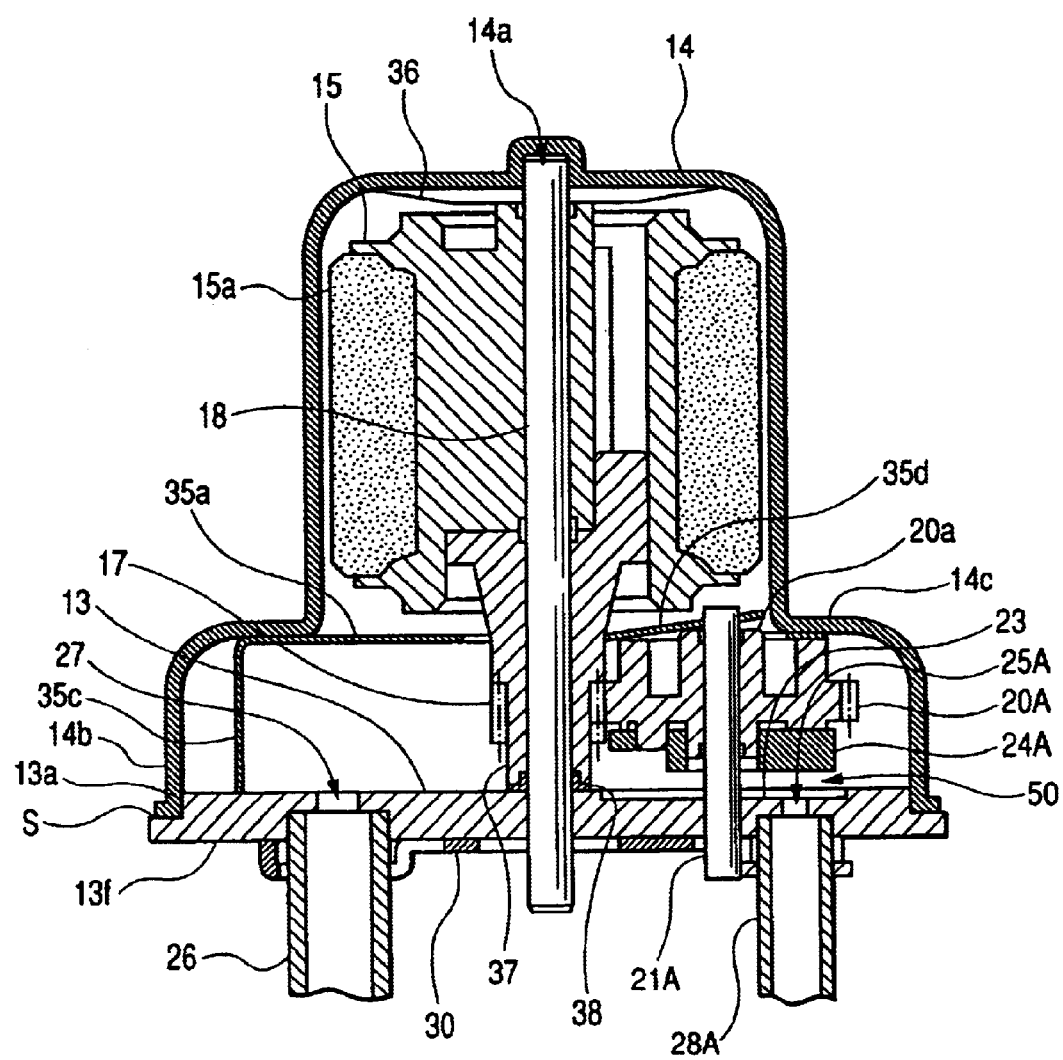
Figure 9A:
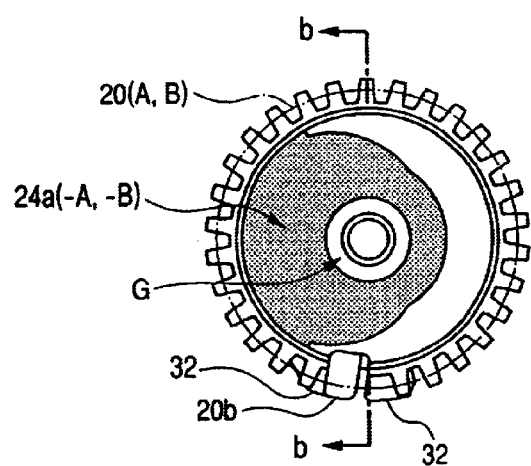
Figure 9B:
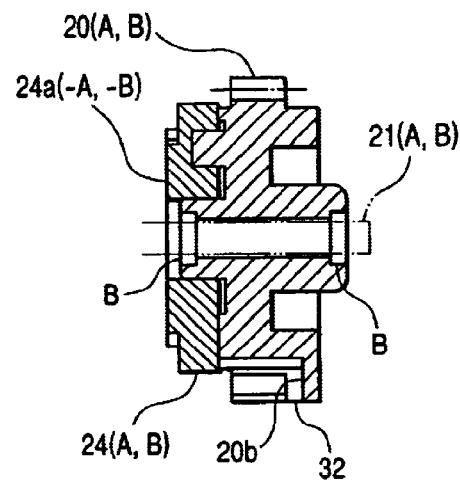
Figure 10A:
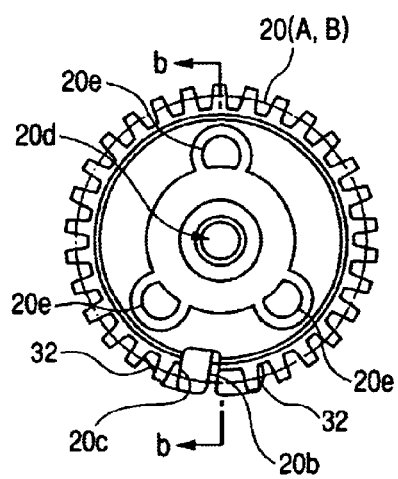
Figure 10B:
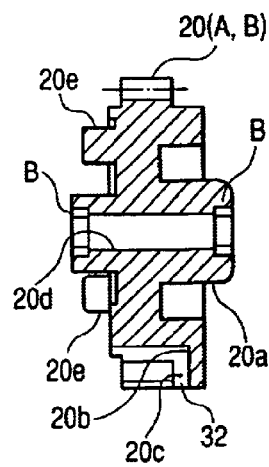
Figure 10C:
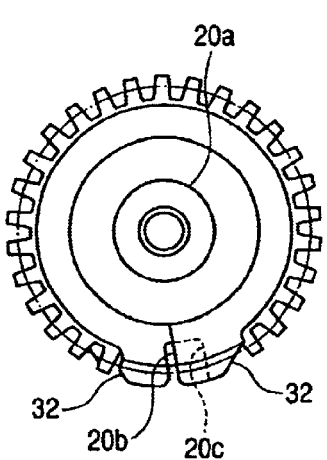
Figure 11A:
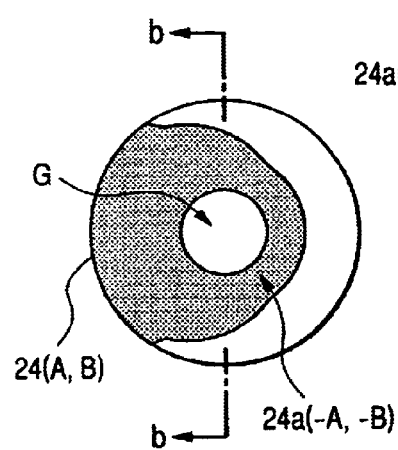
Figure 11B:
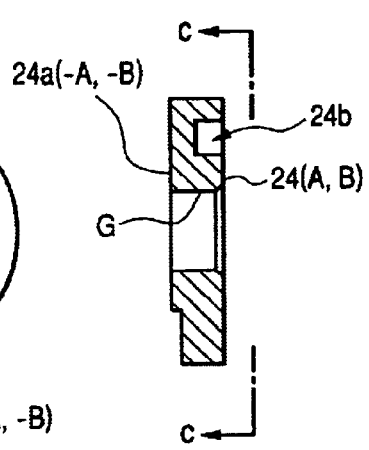
Figure 11C:
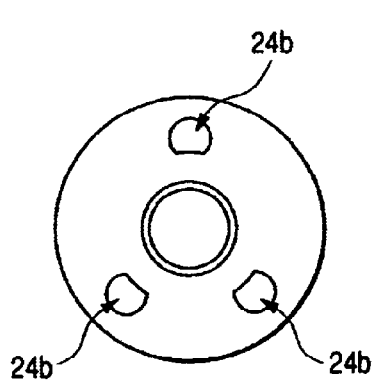
Figure 12A:
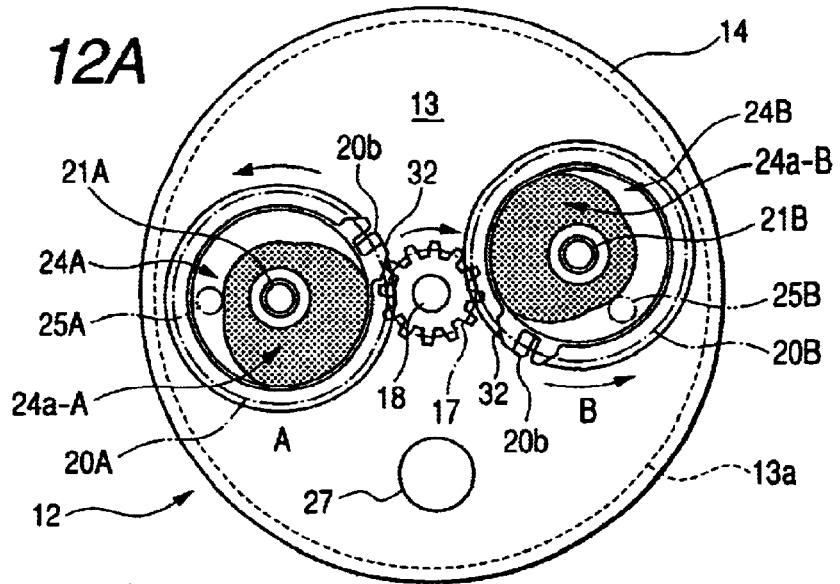
Figure 12B:
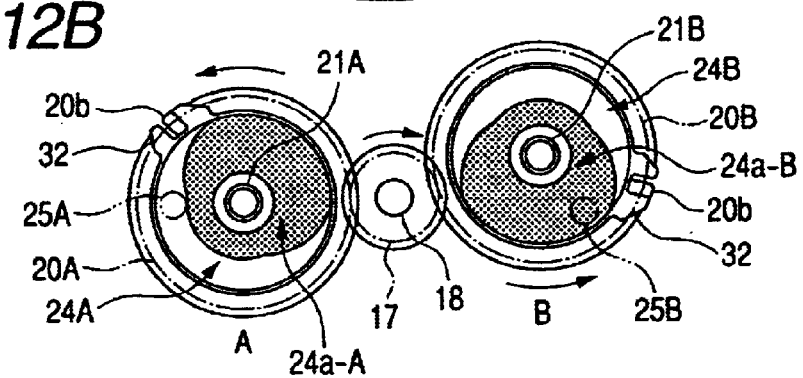
Figure 12C:
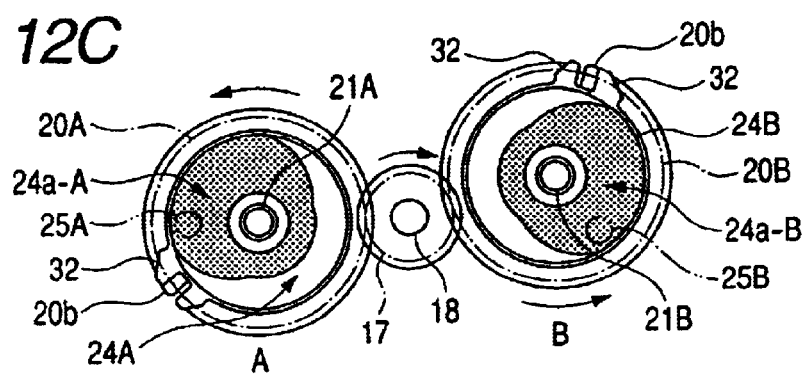
Figure 12D:
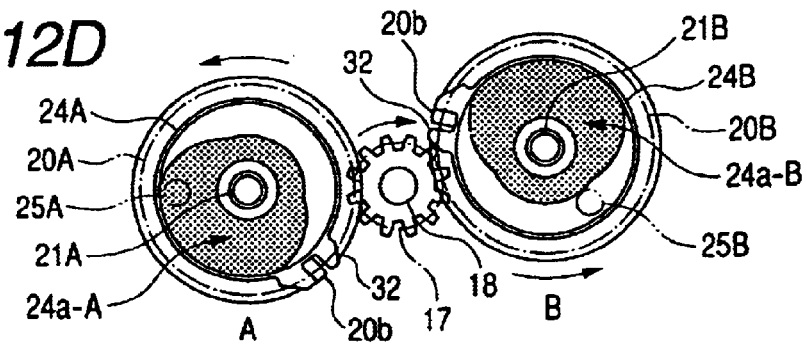
Figure 13:
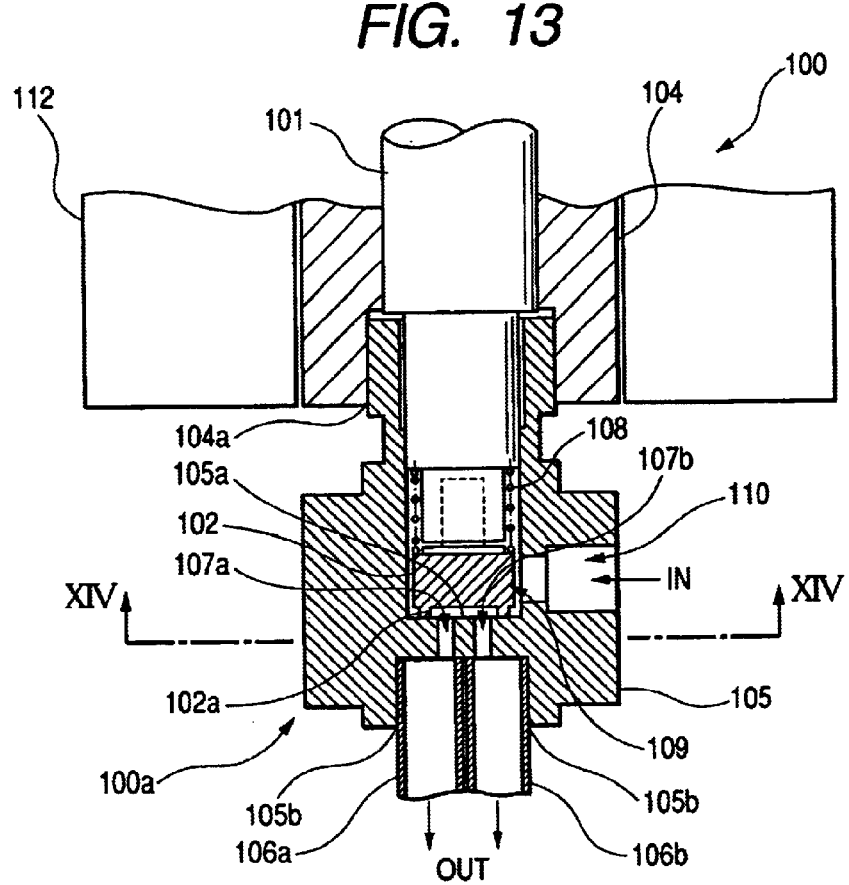
Figures 14A, 14B, 14C, 14D:
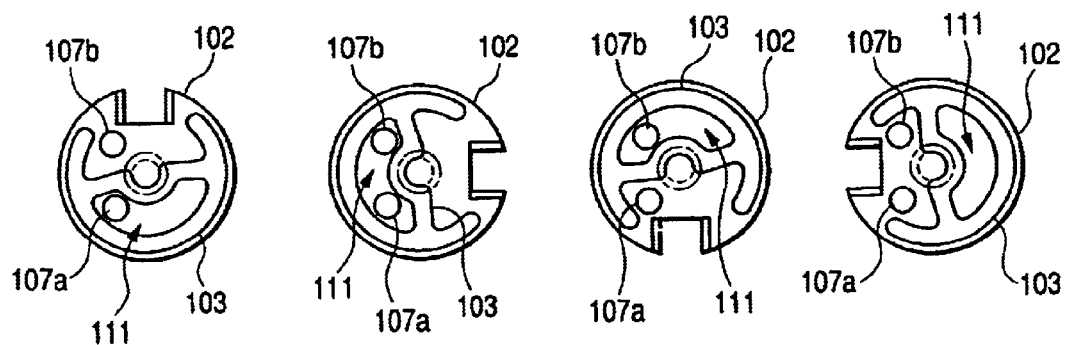
Figure 15:
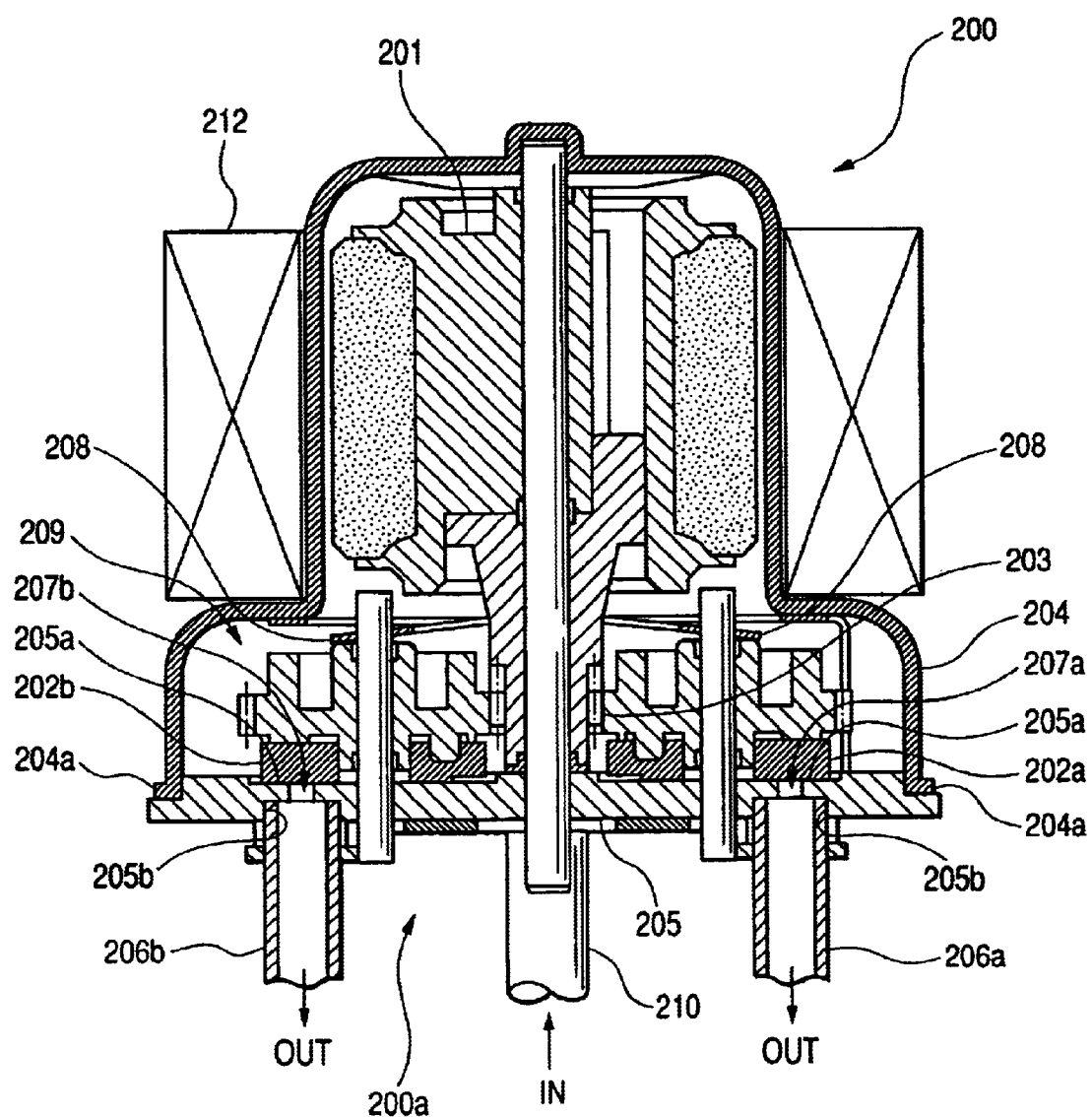

FIGS. 3A to 3D are explanatory diagrams of exterior fitting members in the valve drive device in accordance with the invention, in which FIG. 3A is a rear view illustrating the joining between a pipe holding member and the valve seat plate, FIG. 3B is a rear view illustrating the joining between a stator positioning frame and the pipe holding member, FIG. 3C is a sectional view taken along line c—c in FIG. 3B, and FIG. 3D is a sectional view taken along line d—d in FIG. 3B;

FIGS. 4A and 4B are part drawings of a valve-element holding device in the valve drive device in accordance with the invention, in which FIG. 4A is a plan view, and FIG. 4B is a sectional view taken along line b—b of FIG. 4B;

FIG. 5 is a perspective view explaining a state in which a valve element is retained by the valve-element holding device in the valve drive device in accordance with the invention;

FIG. 6 is a partial plan view explaining the meshing relationship between a pinion and a gear retained by a valve-element retaining portion of the valve-element holding device in the valve drive device in accordance with the invention;

FIG. 7 is a partial assembly drawing of the valve-element holding device and the gear in the valve drive device in accordance with the invention, and is a sectional side view explaining the gear and the valve element which are in a retained position;

FIG. 8 is an enlarged sectional side view of the valve drive device in accordance with the invention;

FIGS. 9A and 9B are partial assembly drawings of the valve element and the gear in the valve drive device in accordance with the invention, in which FIG. 9A is a rear view, and FIG. 9B is a sectional view taken along line b—b of FIG. 9B;

FIGS. 10A to 10C are part drawings of the gear in the valve drive device in accordance with the invention, in which FIG. 10A is a rear view, FIG. 10B is a sectional view taken along line b—b of FIG. 10A; and FIG. 10C is a plan view;

FIGS. 11A to 11C are part drawings of the valve element in the valve drive device in accordance with the invention, in which FIG. 11A is a rear view, FIG. 11B is a sectional view taken along line b—b of FIG. 11A, and FIG. 11C is a plan view taken in the direction of arrows c in FIG. 11B;

FIGS. 12A to 12D are explanatory diagrams illustrating open-close modes of the valve element in the valve drive device in accordance with the invention in which FIG. 12A shows a state in which the valve A is open and the valve B is open, FIG. 12B shows a state in which the valve A is open and the valve B is closed, FIG. 12C shows a state in which the valve A is closed and the valve B is closed, and FIG. 12D shows a state in which the valve A is closed and the valve B is open;

FIG. 13 is a sectional side view of portions of an example of a conventional motor-operated expansion valve;

FIGS. 14A to 14D are views taken along line XIV—XIV of FIG. 13, and are rear views explaining open-close modes of the valve; and FIG. 15 is a sectional side view of another example of the conventional motor-operated expansion valve.

DETAILED DESCRIPTION OF THE PREFERRED EMBODIMENTS

Figure 1:
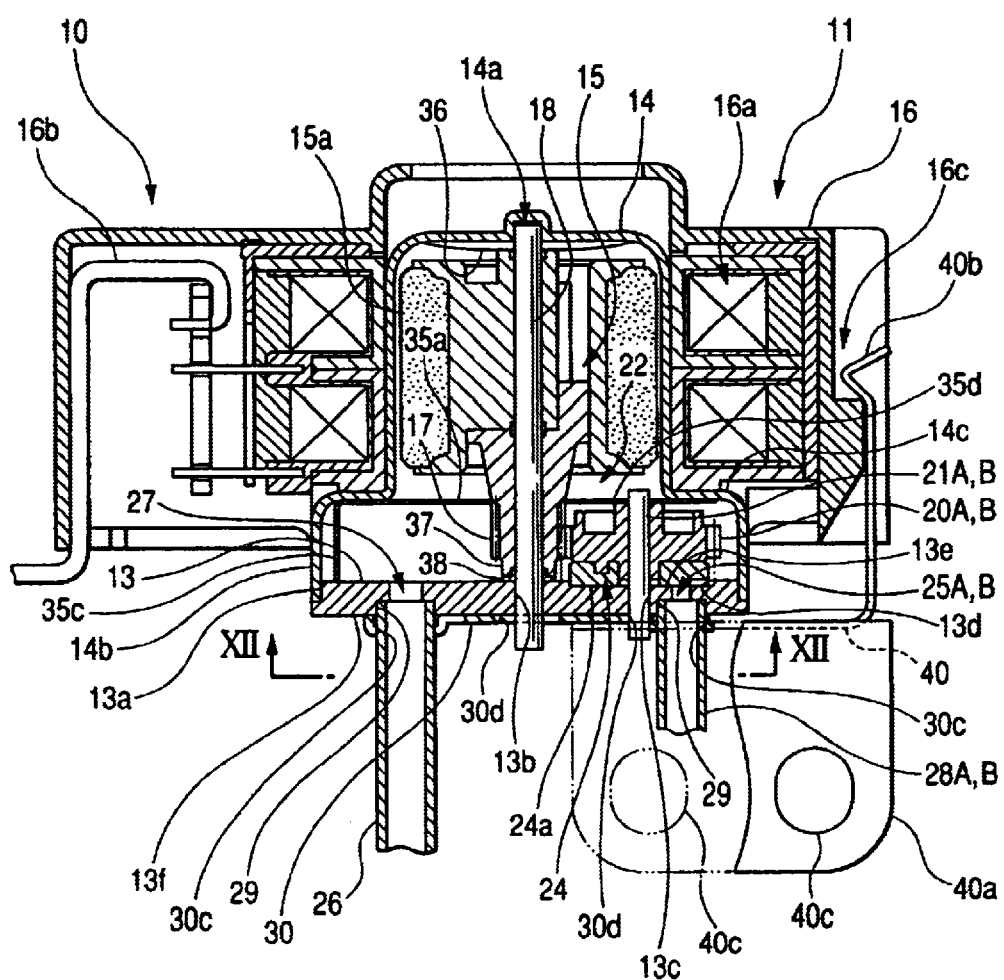
FIG. 1 is a sectional side view of an embodiment of a motor-operated expansion valve including a valve drive device in accordance with the invention.

Referring now to the accompanying drawings, a description will be given of an embodiment of a valve drive device in accordance with the invention. FIG. 1 is a vertical sectional side view of an embodiment of a motor-operated expansion valve 10 in its entirety which includes a valve drive device 11 in accordance with the invention. The valve drive device 11 is formed on a valve seat plate 13 (see FIGS. 2A to 2C) formed by subjecting a metal plate to press forming, and is gastightly sealed by a housing 14, and is adapted to rotatively drive a rotor 15 by a stator 16 provided circumferentially on the housing 14 in close contact with the outer side thereof. As a drive signal is inputted from a computer (not shown) to a conductor 16b connected to a stator coil 16a of the stator 16, the valve drive device 11 controls the rotation and stop of the rotor 15 at a predetermined angle.

The rotor 15 has a magnet 15a fixed integrally to its outer periphery and a pinion 17 formed on an end portion thereof on the valve seat plate 13 side, and is rotatably supported by a rotor supporting shaft 18 which is fixed. The diameter of the housing 14 is reduced such that an outer peripheral surface of the magnet 15a of the rotor 15 and an inner peripheral surface of the stator coil 16a are located close to each other, and the rotor 15 is provided with a recess 14a fitting to one end of the supporting shaft 18 of the rotor 15 on a closed end side of the housing 14 so as to stably support the one end at a central position. An open end 14b side of the housing 14 has an enlarged diameter and is provided with a stepped portion 14c for mounting the stator 16 thereon. An inner surface of the open end 14b having the enlarged diameter is closely fitted to an enlarged-diameter peripheral edge portion 13a at the stepped outer periphery of the valve seat plate 13 formed by press forming. If the open end 14b of the housing 14 is fitted on the enlarged-diameter peripheral edge portion 13a of the valve seat plate 13, a central hole 13b of the valve seat plate 13 and the fixed-shaft supporting recess 14a of the housing 14 are aligned on the same axis.

Figure 2A:
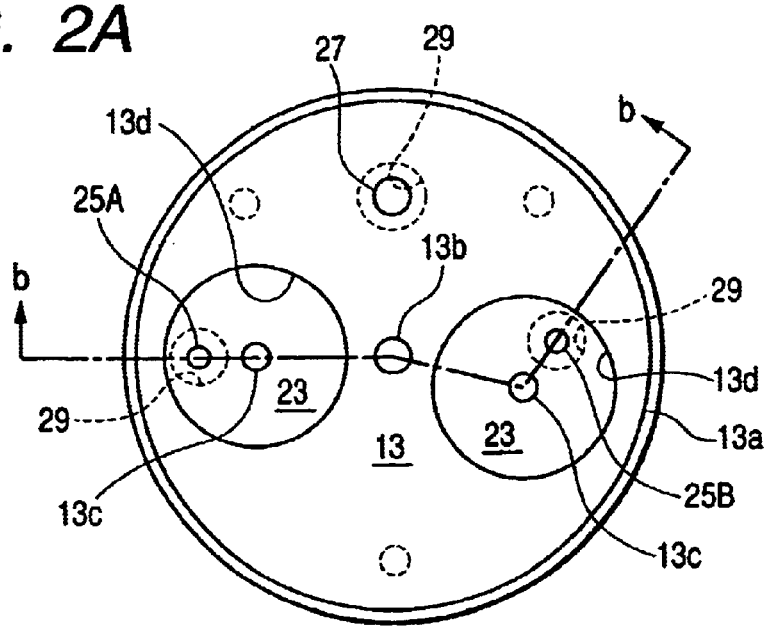
Figure 2B:
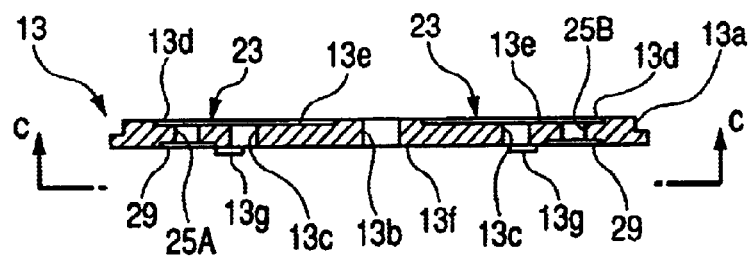
Figure 2C:
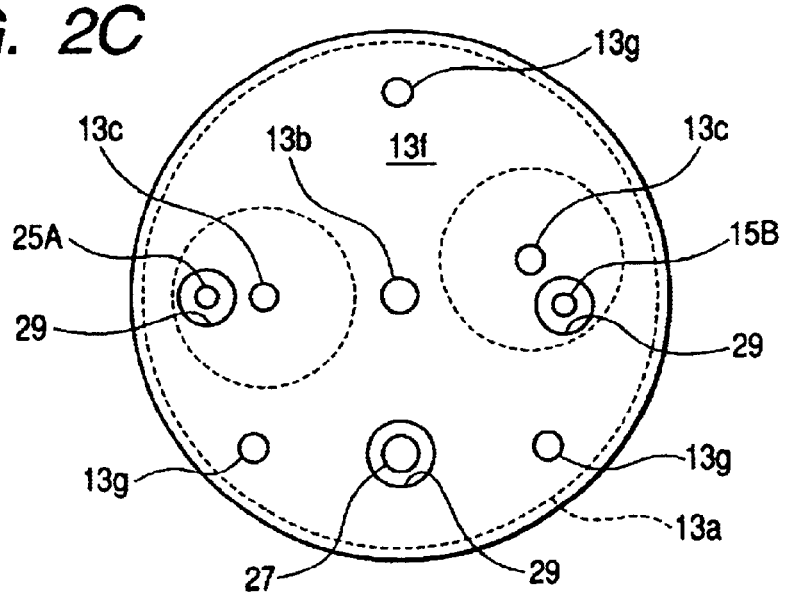

FIG. 2A is a plan view of the valve seat plate 13 as seen from a valve seat 23 side; FIG. 2B is a sectional view taken along line b—b of FIG. 2A; and FIG. 2C is a rear view taken in the direction of arrows c—c of FIG. 2B. The central hole 13b extends through the valve seat plate 13, the rotor supporting shaft 18 is press fitted from a reverse surface 13f side located away from the valve seat 23, is passed through the valve seat plate 13, and is provided uprightly to a height for fitting to the recess 14a in the center of the housing 14 on the valve seat 23 side.

Fixing holes 13c for supporting shafts 21A and 21B of two gears of the same shape (see FIGS. 9A through 10B) meshing with the rotor pinion 17 are formed in two symmetrical portions of the valve seat plate 13 on both sides of the central hole 13b. The gears 20A and 20B are rotatably supported by the supporting shafts 21A and 21B as rotation transmitting members. In addition, the valve seat plate 13 is shallowly stamped by press forming to form a pair of circular steps 13d which are each concentric with the shaft fixing hole 13c and has an outside diameter approximately equivalent to the diameter of each of the gears 20A and 20B and to form a pair of smooth flat surfaces 13e, thereby forming the two valve seats 23 (see FIGS. 2A and 2B). The depth of each recessed flat surface 13e is illustrated in exaggerated form. As a result, each valve seat 23 which abuts against a sliding contact surface 24a (-A, -B) (see FIGS. 11A and 11B) of a valve element 24 provided projectingly on the lower surface of each of the gears 20A and 20B with a predetermined pattern can be secured with required surface roughness in a limited portion of the valve seat plate 13.

A small-diameter communicating hole 25 (A, B) communicating with an outflow pipe 28 (A, B) is formed in each of these valve seats 23 at an appropriate position close to an edge of the valve seat plate 13. Further, a communicating hole 27 communicating with an inflow pipe 26 is formed in a portion of the valve seat plate 13 which does not interfere with the valve seat 23. In addition, shallow stepped holes 29 substantially concentric with the communicating holes 25A, 25B, and 27 and fitting to the outside diameters of the outflow pipes 28A and 28B and the inflow pipe 26 are respectively formed by stamping (the illustration is exaggerated). Further, positioning projections 13g are vertically embossed at three portions from the reverse surface 13f side.

FIGS. 3A and 3B are illustrations of the valve seat plate as viewed from the reverse surface 13f side. A pipe supporting plate 30 such as the one shown in FIG. 3A is superposed on the reverse surface 13f of the valve seat plate 13 provided with the stepped holes 29, such that knock holes 30h formed in the pipe supporting plate 30 in correspondence with the positioning projections 13g are fitted to the positioning projections 13g. The pipe supporting plate 30 is then secured to the valve seat plate 13 by caulking the positioning projections 13g. The pipe supporting plate 30 is a thin metal plate formed by press forming, and stepped portions 30a formed by bending, such as those shown in FIGS. 3C and 3D, are provided at positions corresponding to the stepped holes 29 for fitting the three pipes including the inflow pipe 26 and the first and second outflow pipes 28A and 28B, thereby forming holding brackets 30b spaced apart from the fixing surface with respect to the valve seat plate 13. Further, through holes 30c, which support side surfaces of the pipes by coming into close contact with the outside diameter portions of the inflow pipe 26 and the first and second outflow pipes 28A and 28B and hold the pipes in an upright state in cooperation with the stepped holes 29, are formed in the pipe supporting plate 30 at positions aligned with the respective pipe-fitting stepped holes 29.

Side grooves 30e in the form of key hole extend from the through holes 30c to facilitate the pouring of a brazing filler metal and ensure that gastight sealing can be effected reliably. In addition, loosely inserting holes 30d surrounding with large leeway the outside diameter portions of the supporting shafts 18, 21A, and 21B are formed in the pipe supporting plate 30 at positions corresponding to the central hole 13b and the shaft fixing holes 13c of the valve seat plate 13. Further, the brazing filler metal is deposited on joints between the outer peripheries of the supporting shafts 18, 21A, and 21B and the reverse surface 13f of the valve seat plate, thereby facilitating the ensuring of gastightness.

Further, retaining pieces 30g are cut out in the pipe supporting plate 30, and a stator positioning frame 40 is superposed on the pipe supporting plate 30 by allowing the retaining pieces 30g to be passed through its elongated rectangular holes 40d, and the retaining pieces 30g are then bent to effect tab connection, as shown in FIG. 3B. As shown in FIG. 1, a positioning retainer 40b for resiliently engaging a recess 16c for specifying the mounting direction of the stator coil 16a is provided uprightly on the stator positioning frame 40.

As a result, as for the pipe supporting plate 30 whose positional relationship with the valve seat plate 13 is fixed by the positioning projection 13g, its positional relationship with the stator positioning frame 40 is determined by the retaining pieces 30g. Hence, it is possible to mechanically determine the mounting direction of the stator coil 16a which is set by the retainer 40b of the stator positioning frame 40, as well as the relationship of layout with respect to the rotating angles of the gears 20A and 20B. In addition, a mounting seat 40a for the motor-operated expansion valve 10 is formed in the stator positioning frame 40 by bending an extended portion of its outer edge, and two mounting holes 40c through which fixing bolts (not shown) are inserted are formed in the mounting seat 40a.

FIGS. 3C and 3D are sectional views taken along line c—c and line d—d, respectively, of FIG. 3B, and are diagrams which are inverted with respect to the direction illustrated in FIG. 1. A total of three supporting shafts, including the rotor supporting shaft 18 and the two gear supporting shafts 21A and 21B, are respectively press fitted in the central hole 13b and the shaft fixing holes 13c from the direction of the reverse surface 13f of the valve seat plate. Further, a total of three pipes, including the inflow pipe 26 and the first and second outflow pipes 28A and 28B, are inserted and fitted in the corresponding through holes 30c in the pipe supporting plate 30, and are set upright, and their end faces are seated in the stepped holes 29 recessed in the reverse surface 13f of the valve seat plate 13. Welding or brazing is effected with respect to these six regions for exteriorly fitting the total of six members from the reverse surface 13f side of the valve seat plate, and gastightness is thereby ensured. Thus, since the distance between the pipes can be made long, and all the inflow pipe 26 and the outflow pipes 28A and 28B are arranged in the identical reverse surface 13f, the assembly and the brazing operation from the same direction are facilitated, and the operating efficiency improves, so that the quality becomes stabilized.

FIGS. 4A and 4B show a multifunctional valve-element holding device, in which FIG. 4A is a plan view, and FIG. 4B is a sectional view taken along line b—b of FIG. 4A. As for the valve-element holding device 35, a base 35a has an annular shape in which a loosely inserting hole 35b for the pinion 17 extending from the rotor 15 is provided in its center. A pair of belt-shaped portions extending from an outer periphery of the base 35a at substantially symmetrical positions are bent orthogonally downward, as shown in FIG. 4B, so as to form a pair of leg portions 35c. A pair of through holes 35e through which the bear supporting shafts 21A and 21B are inserted are formed in the base 35a at positions corresponding to the gear supporting shafts 21A and 21B.

A pair of arcuate resilient arms 35d, which respectively surround the through holes 35e in their distal circular land portions 35f, are each cut out by punching out two arcuate slots 35g, thereby forming a pair of cantilevered resilient beams. The arcuate slots 35g are made to communicate with the outside of the annular base 35a by cutting off their outer edge portions, thereby similarly forming a pair of cantilevered beams constituting a pair of valve-element retaining portions 34. Distal ends of the valve-element retaining portions 34 are finished to a length for setting the teeth of the gears 20A and 20B in a specific direction so as to form a pair of restricting positions 34a.

Namely, the valve-element holding device 35 has a combination of four functions including: the function for supporting the annular base 35a to a specific height from the valve seat plate 13 by the leg portions 35c; the function for retaining the valve elements 24A and 24B shown in FIGS. 9A and 9B to the height of the annular base 35a by the valve-element retaining portions 34; a jig function for positioning the teeth of the gears 20A and 20B in a specific direction by the restricting positions 34a of the valve-element retaining portions 34; and the function of bringing the valve elements 24A and 24B into pressure contact with the valve seat 23 through the bears 20A and 20B by the resilient arms 35d.

FIG. 5 is a perspective view illustrating a form in which the gear 20A is lifted upward against the urging force with which the resilient arm 35d inserted through the through hole 35e from above the gear 20A inserted in the supporting shaft 21A presses a gear boss end portion 20a toward the valve seat 23, and the gear 20A is retained by the valve-element retaining portion 34 of the valve-element holding device 35. The gear 20A is rotatably supported by the supporting shaft 21A, and is slidable along the supporting shaft 21A. Although only the gear 20A is shown in enlarged form to simplify the illustration, the same applies to the gear 20B as well. The gear 20A is rotated until the valve-element retaining portion 34 is forcibly inserted onto a lower side of a pocket-like hook portion 20b recessed in an upper portion of the gear in opposition to its resiliency, and an innermost barrier 20c abuts against the restricting position 34a at the distal end of the valve-element retaining portion 34. Each of the gears 20A and 20B is clamped by the resiliently restoring forces of the resilient arm 35d and the valve-element retaining portion 34, and their relational positions are oriented with respect to their angles of mutual rotation in this state.

FIG. 6 shows that the pinion 17 which has been fitted over the rotor supporting shaft 18 from above and lowered is able to smoothly mesh with both gears 20A and 20B, whose relative positions have been thus related, simultaneously without interfering with each other. Namely, since the gears 20A and 20B are oriented at the restricting positions 34a, the meshing with the pinion 17 can be effected without needing to mutually adjust the positions of the teeth.

FIG. 7 is a schematic side view, partly in section, illustrating a form in which the boss end portion 20a of the gear 20A is pressed downward by the resilient arm 35d, and the valve-element retaining portion 34 lifts up the hook portion 20b of the gear 20A from below by its resiliency against the urging force of the resilient arm 35d, with the result that the pinion 17 meshes with the gear 20A, which is in a state of being clamped at a height spaced apart from the valve seat plate 13, without needing to mutually adjust the relational positions of the teeth. Although only the gear 20A is shown in enlarged form in FIG. 7 to avoid the complication of the illustration, the same applies to the gear 20B as well.

As shown in FIGS. 5 and 7, the valve element 24A which is integral with the gear 20A and is supported by frictional connection is held at a spaced-apart position above the valve seat plate 13, and an air insulation layer 50 is formed therebetween. Hence, the pinion 17 serving as a driving member above the valve seat plate 13 and including the rotor 15, the gears 20A and 20B which are rotation transmitting members, and the valve elements 24A and 24B are all covered with the housing 14. The open end 14a of the housing 14 is then fitted to the peripheral edge portion 13a of the valve seat plate 13, and their end faces are brought into close contact with each other.

As shown in FIG. 8, a leaf spring 36 provided on an outer periphery of the supporting-shaft supporting recess 14a concentrically with the rotor 15 in an upper portion of the housing 14 urges the rotor in the axial direction to eliminate play in the thrust direction, and acts to absorb the thermal expansion and shrinkage of the rotor 15. In addition, a lower end 37 of the rotor 15 is supported by a washer 38 formed of a ceramic-base heat insulating material. The valve-element holding device 35 is held stably since its annular base 35a is brought into pressure contact with the inner surface of the enlarged-diameter stepped portion 14c of the housing 14. A joint S between the open end 14b of the housing 14 and the peripheral edge portion 13a of the valve seat plate 13 is gastightly sealed by TIG welding over its entire periphery in a state in which the valve elements 24A and 24B are retained by the valve-element holding device 35, and the gap 50 is maintained between each of the valve elements 24A and 24B and the valve seat 23. Since the air layer 50 between each of the valve elements 24A and 24B and the valve seat plate 13 demonstrates a heat insulating effect, welding can be effected by taking time to allow a gastight seal to be effected reliably, and since natural heat dissipation is subsequently possible, the welding quality can be improved.

After the welding heat has been completely dissipated, the exterior fitting of the valve drive device 11 is effected (see FIG. 1). The stator 16 is fitted over the outer periphery of the housing 14, and the mounting direction of the stator coil 16a is specified by the recess 16c with which the retainer 40b of the stator positioning frame 40 is engaged. Electric power and a control pulse signal are supplied to the stator coil 16a through the conductor 16b to rotate the rotor 15 by a predetermined number of steps, which in turn causes the gears 20A and 20B to be driven in the direction in which the hook portions 20b are disengaged from the valve-element retaining portions 34. The moment the hook portions 20b are disengaged from the valve-element retaining portions 34, the gears 20A and 20B are pushed by the resilient arms 35d, move to sufficiently spaced-apart lower positions where the gears 20A and 20B are not interfered by the valve-element retaining portions 34, bringing the respective sliding contact surfaces 24a of the valve elements 24A and 24B into pressure contact with the respective valve seats 23. Further, the gears 20A and 20B which have become free each rotate up to and stops at the position located immediately before a non-gear projection 32 abuts against the pinion 17 (see FIG. 12A).

This stop position determines an origin of mechanical starting. Accordingly, even if a pulse for forcibly effecting further rotation in the same direction is supplied to the stator coil 16a, the rotation of the gear 20A is mechanically prevented as the non-gear projection 32 abuts against the pinion 17. Accordingly, an origin of the electrical signal pulse is set to this stop position. The mounting direction of the stator coil 16a and the relational position with the respect to the origin of gear starting are not destroyed insofar as the retainer 40b of the stator positioning frame 40 maintains its engagement with the recess 16c for specifying the direction of the stator coil 16a. The gears 20A and 20B are capable of rotating smoothly in either direction irrespective of the valve-element holding device 35. Since the origin of gear starting mechanically determines the origin of the angle of rotation of the rotor 15, after the matching with the origin of the pulse signal, the valve elements 24A and 24B can be freely rotated to change the areas covering the openings of the communicating holes 25 (A, B) in correspondence with the angles of rotation of the valve elements 24A and 24B in view of patterns of the sliding contact surfaces 24a thereof, thereby making it possible to effect reliable flowrate control in accordance with predetermined patterns.

Even if the stator 16 is drawn out by being disengaged from the retainer 40b due to an unexpected event, the restoration of the origin of the signal pulse is possible by restoring the engagement between the direction-specifying recess 16c of the stator 16 and the retainer 40b and by detecting the position where the non-gear projection 32 of the gear 20A abuts against the pinion 17 and the rotation is mechanically prevented.

FIG. 9A is a plan view in which the valve element 24 (A, B) and the gear 20 (A, B), as viewed from the valve seat side, are combined, and FIG. 9B is a sectional view taken along line b—b of FIG. 9A. FIG. 10A is a plan view of the gear 20 (A, B), and FIG. 10B is a sectional view taken along line b—b of FIG. 10A. In addition, FIG. 10C is a rear view of FIG. 10A. The gear 20 (A, B) is provided with the non-gear projection 32 incapable of meshing with the pinion 17 by partially dropping the teeth. Consequently, the rotation of the gear 20 (A, B) is restricted, and it is possible to set the origin of starting.

A through hole 20d through which the supporting shaft 21 (A, B) is loosely fitted, is formed in the center of the gear 20 (A, B), and a pair of bearing bushes B, which are rotatably brought into sliding contact with the supporting shaft 21 (A, B), are press fitted in openings at both ends of the gear 20 (A, B). In addition, the gear 20 has the drive pin 20c which is fitted to a hole with a bottom 24b of the valve element 24 (A, B) to restrict the radial direction. The gear 20 (A, B) rotates about the supporting shaft 21 (A, B) integrally with the valve element 24 (A, B) while bringing the valve element 24 (A, B) into pressure contact with the valve seat 23.

FIG. 11A is a rear view of the valve element 24 (A, B), and FIG. 11B is a sectional view taken along line b—b of FIG. 11A. In addition, FIG. 11C is a plan view taken in the direction of arrows c in FIG. 11B. A step is provided between a surface perpendicular to the axis of the valve element 24 (A, B) and the sliding contact surface 24a (-A, -B) shown by cross hatching, and the sliding contact surface 24a (-A, -B) slides in close contact with the smooth valve seat surface 13e recessed in the valve seat plate 13. Accordingly, as for the communicating holes 25A and 25B covered completely by the sliding contact surface 24a (-A, -B), channels leading from a valve chamber 22 to the outflow pipes 28A and 28B are closed and are shut off from the inflow pipe 26. By virtue of the stepped pattern of the sliding contact surface 24a (-A, -B), the communicating holes 25A and 25B undergo gradual transition between the fully open state and the fully closed state in correspondence with the angle of rotation of the gear 20 (A, B), thereby effecting regulation of the flowrate.

A space portion G whose diameter is larger than the outside diameter of the supporting shaft 21 (A, B) is formed in the center of the valve element 24 (A, B). The space portion G makes it possible to maintain the close contact of necessary portions of the sliding contact surface 24a (-A, -B)

irrespective of a defect in the flatness occurring at the time of press fitting of the supporting shaft 21 (A, B) and without being interfered by the oozing out of the welding filler metal at the root of the supporting shaft 21 (A, B). By separating the valve element 24 (A, B) from the driven gear 20 (A, B) in the above-described manner, the sliding contact portion can be formed with uniform shape and thickness, and required flatness and surface roughness can be secured for the sliding contact surface 24a (-A, -B). Moreover, the valve element 24 (A, B) can be fabricated by molding which facilitates the formation of a smooth surface, and a material for which heat resistance is not required can be selected freely. Thus, since the valve element 24 (A, B) can be molded with appropriate hardness and resiliency irrespective of the gear, the valve element 24 (A, B) can be formed of a material excelling in the contact based on the resiliency of its own.

Next, a brief description will be given of the operation of the motor-operated expansion valve 10 with reference to FIGS. 12A to 12D. FIG. 12A illustrates a form in which the valve seat plate 13 is viewed in the direction of arrows XII—XII of FIG. 1. The four modes in which the contour patterns of the sliding contact surfaces 24a-A and 24a-B open and close the communicating holes 25A and 25B are shown in FIGS. 12A to 12D. FIG. 12A shows a state in which both the first communicating hole 25A and the second communicating hole 25B are open; FIG. 12B shows a state in which the first communicating hole 25A is open and the second communicating hole 25B is closed; FIG. 12C shows a state in which both the first communicating hole 25A and the second communicating hole 25B are closed; and FIG. 12D shows a state in which the first communicating hole 25A is closed and the second communicating hole 25B is open.

Although the embodiment has been described above, the invention is not limited to the illustrated embodiment, and it is expected that, concerning its shape, arrangement, and the like, various changes concerning detailed parts and modifications of parts such as their restructuring can be made within the scope that does not depart from the constituent requirements of the invention. For example, the valve element may be provided with a roof portion or the like to directly raise the valve element by a spring, or a separate member having the shape of an L-shaped washer is placed between the gear and the valve element, and the separate member may be engaged with a spring to raise the valve element. In addition, the gist of the invention is naturally compatible with the motor-operated expansion valve cited as the conventional example.

As is apparent from the foregoing description, according to the valve drive device in accordance with the invention, the valve element is capable of being spaced apart from the valve seat plate, and holding device is provided for tentatively retaining the valve element at a spaced-apart position spaced apart from the valve seat plate when the valve seat plate and the housing are welded together. For this reason, an air layer extremely excelling in heat insulation is formed between the valve element and the valve seat plate, so that the valve element can be protected from welding heat, and the deformation of a sliding contact surface is prevented. Therefore, it is possible to satisfactorily maintain the sealing characteristic of the valve element.

What is claimed is:

1. A valve drive device having a plurality of openings for communicating with an inflow pipe and an outflow pipe, said valve drive device comprising:

a valve element for opening and closing said openings;

a driving member for driving said valve element;

a rotation transmitting member for transmitting rotation from said driving member to said valve element;

a valve seat plate in which said openings are formed and on which said valve element is slid in pressure contact therewith so as to open and close said openings; and a housing for gastightly sealing said valve seat plate and said valve element together with said driving member and said rotation transmitting member so as to form a hermetically sealed space; and a holding device provided for tentatively retaining said valve element at a spaced-apart position spaced apart from said valve seat plate;

wherein said valve element is retained at the space-apart position when said valve seat plate and said housing are welded together.

2. The valve drive device according to claim 1, wherein said holding device is configured to retain said valve element so as to be spaced apart from said valve seat plate in opposition to an urging device for bringing said valve element into pressure contact with said valve seat plate; and wherein said valve element is returned to an abutment position against said valve seat plate by said urging device when a retention of said valve element by said holding device is canceled, and said valve element is spaced apart from said holding device so that a rotating operation of said valve element for opening and closing is not interfered by said holding device.

3. The valve drive device according to claim 2, wherein a holding operation where said valve element is retained by said holding device is effected by a rotation of said valve element, and there is provided a restricting position for preventing the rotation of said valve element at a predetermined angle of rotation.

4. The valve drive device according to claim 3, wherein a relative angular relationship between an origin of starting of said valve element and a preventing portion provided on said rotation transmitting member for mechanically preventing the rotation of said valve element at the origin of starting are uniformly defined by the restricting position.

5. The valve drive device according to claim 3, wherein said rotation transmitting member is constituted by a gear.

6. The valve drive device according to claim 2, wherein a cancellation of a retention between said urging device and said valve element is effected by an operation of said valve element itself.

* * * * *